(12) United States Patent
Lee

(10) Patent No.: US 7,253,843 B2
(45) Date of Patent: Aug. 7, 2007

(54) DUAL MODE SIGNAL PROCESSING APPARATUS AND METHOD USING A PICTURE-IN-PICTURE (PIP) MODE

(75) Inventor: Yong-hyun Lee, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 801 days.

(21) Appl. No.: 10/686,729

(22) Filed: Oct. 17, 2003

(65) Prior Publication Data

US 2004/0105012 A1     Jun. 3, 2004

(30) Foreign Application Priority Data

Nov. 28, 2002   (KR) .................. 10-2002-0074897

(51) Int. Cl.
*H04N 5/262*  (2006.01)
*H04N 5/45*  (2006.01)

(52) U.S. Cl. ................ 348/565; 348/584; 348/598; 348/705; 348/220.1; 348/222.1

(58) Field of Classification Search ........... 348/565, 348/563, 564, 584, 588, 598, 705, 220.1, 348/222.1, 239, 14.11; 382/284; 358/450; 345/630, 629
See application file for complete search history.

(56) References Cited

U.S. PATENT DOCUMENTS

| | | | | |
|---|---|---|---|---|
| 4,998,171 A | * | 3/1991 | Kim et al. ................... | 348/565 |
| 5,053,868 A | * | 10/1991 | Higgins et al. ............. | 348/150 |
| 5,148,275 A | * | 9/1992 | Blatter et al. .............. | 348/567 |
| 5,502,487 A | * | 3/1996 | Choi .......................... | 348/239 |
| 5,712,680 A | * | 1/1998 | Hieda ....................... | 348/220.1 |
| 5,754,253 A | * | 5/1998 | Lee ........................... | 348/565 |
| 5,978,046 A | * | 11/1999 | Shintani ..................... | 348/589 |
| 5,990,974 A | * | 11/1999 | Amino et al. ............... | 348/588 |

(Continued)

*Primary Examiner*—David Ometz
*Assistant Examiner*—Jean W. Désir
(74) *Attorney, Agent, or Firm*—Roylance, Abrams, Berdo & Goodman, LLP

(57) ABSTRACT

The present invention relates to a dual mode signal processing apparatus using a picture-in-picture (PIP) window. In particular, the present invention relates to a display apparatus and a function switching apparatus that display two views for DSPs performing different functions in use of a PIP window so that two functions are simultaneously performed. In order to achieve the such an object, embodiments of the present invention comprise at least one or more digital signal processors (DSPs) for processing different signals; a picture-in-picture(PIP) block for inputting a composite image signal, a chrominance signal, and so on, mixing two signals, and outputting one composite signal; a first signal switching unit for selecting an input of signals of the plural DSPs and outputting the selected signal to the PIP block; a second signal switching unit for selecting a composite image signal outputted from the DSPs and outputting the selected composite image signal to the PIP block; and a display unit for inputting and displaying an output signal of the PIP block. The embodiments further employ an input unit having a mode selection button and PIP-related function buttons; and a control unit for switching signals with an input of the input unit and controlling a system. Accordingly, embodiments of the present invention convert the function of the system by changes of the main view and the PIP window in the mixed display from two mixed image signals, and enables the same functions to operate with one button selection, to thereby perform combined functions with simplicity.

11 Claims, 4 Drawing Sheets

U.S. PATENT DOCUMENTS

| | | | |
|---|---|---|---|
| 6,011,594 A * | 1/2000 | Takashima | 348/565 |
| 6,151,069 A * | 11/2000 | Dunton et al. | 348/220.1 |
| 6,295,094 B1 * | 9/2001 | Cuccia | 348/559 |
| 6,359,649 B1 * | 3/2002 | Suzuki | 348/220.1 |
| 6,384,868 B1 * | 5/2002 | Oguma | 348/564 |
| 6,417,886 B1 * | 7/2002 | Tariki | 348/384.1 |
| 6,441,862 B1 * | 8/2002 | Yuen et al. | 348/565 |
| 6,490,407 B2 * | 12/2002 | Niida | 386/69 |
| 6,519,000 B1 * | 2/2003 | Udagawa | 348/220.1 |
| 6,556,242 B1 * | 4/2003 | Dunton et al. | 348/220.1 |
| 6,680,748 B1 * | 1/2004 | Monti | 348/220.1 |
| 6,714,192 B1 * | 3/2004 | Torres | 348/220.1 |
| 6,754,010 B2 * | 6/2004 | Takeshita | 359/697 |
| 6,771,319 B2 * | 8/2004 | Konuma | 348/584 |
| 6,795,125 B2 * | 9/2004 | Yui | 348/564 |
| 6,825,858 B2 * | 11/2004 | Sato | 715/735 |
| 6,833,863 B1 * | 12/2004 | Clemens | 348/220.1 |
| 6,833,874 B2 * | 12/2004 | Ozaki et al. | 348/565 |
| 6,961,097 B2 * | 11/2005 | Yui | 348/584 |
| 6,999,131 B2 * | 2/2006 | Kishimoto et al. | 348/705 |
| 7,023,495 B2 * | 4/2006 | Miki et al. | 348/584 |
| 7,046,276 B2 * | 5/2006 | Hashimoto et al. | 348/220.1 |
| 7,088,376 B2 * | 8/2006 | Park | 345/629 |
| 7,154,558 B2 * | 12/2006 | Yui et al. | 348/565 |

* cited by examiner

DUAL MODE SIGNAL PROCESSING APPARATUS AND METHOD USING A PICTURE-IN-PICTURE (PIP) MODE

This application claims benefit under 35 U.S.C. § 119 from Korean Patent Application No. 2002-0074897, filed on Apr. 15, 2002, which is incorporated herein by reference in its entirety.

BACKGROUND OF THE INVENTION

1. Field of the Invention

The present invention relates to a dual mode signal processing apparatus and method using a picture-in-picture (PIP) window, and more particularly to a display apparatus and a function switching apparatus displaying two views for DSPs performing different functions in use of a PIP window so that two functions are simultaneously performed.

2. Description of the Prior Art

In general, the digital signal processor (DSP) is widely used to process a digital signal in real time. The digital signal is generally defined in series numbers or digital values used for representing an analog signal corresponding thereto. The DSP is used in diverse products including audio systems such as small-sized disc players, wireless communication systems such as cellular phones, digital still cameras (DSCs), and digital video camcorder (DVCs).

Recently, dual-function product groups have been in high demand, each of which being sold in one product having two or more combined functions according to the necessity of combination products. In particular, technologies have been actively developed to implement in one product the functions of the DVC recording moving pictures and the DSC taking still images.

This is because the DSC and the DVC have similar functions to each other, having a display unit, a view finder, and a digital signal processor.

FIGS. 1 and 2 show the conventional technology incorporating a DSC and a DVC together. FIG. 1 is a perspective view for showing a conventional picture-taking apparatus combining a digital still camera and a digital video camcorder, and FIG. 2 is a block diagram for showing the conventional picture-taking apparatus. Referring to FIGS. 1 and 2, a main body of the picture-taking apparatus has a DSC signal conversion unit 40, a DVC signal conversion unit 45, a still image codec unit 50, a moving picture codec unit 65, a storage unit 60, an input unit 70, a display unit 80, and a control unit 90 therein.

A camera part 20 is provided with a housing 15 installed to swivel to a certain angle, a first camera 22 taking still images, and a second camera 24 taking moving pictures. Ordinarily, the first camera 22 and the second camera 24 (not visible in FIG. 1) are disposed opposite to each other in the camera part 20.

Accordingly, the camera part 20 rotates to a certain angle in a clockwise or a counterclockwise direction shown with reference to the rotation axis X. Preferably, the DSC lens group 22a and the DVC lens group 24a rotate along with camera part 20, and keep parallel with the picture-taking direction A. That is, when the housing 15 is manually swiveled by 180° or substantially 180° as shown in FIG. 1, it is preferable that the positions of the DSC lens group 22a and the DVC lens group 24a are interchanged.

Referring to FIG. 2, the first camera 22 has the DSC lens group 22a, a DSC driving unit 22b, a DSC detection unit 22c, and a DSC picture-taking unit 22d. The DSC lens group 22a is for taking still images, and the DSC driving unit 22b moves a DSC zoom lens (not shown) and a DSC focus lens (not shown) according to controls of the control unit 90.

The DSC detection unit 22c is a sensor for detecting lens positions according to the controls of the control unit 90. DSC picture-taking unit 22d converts an image signal for a subject passing through the DSC zoom lens(not shown) and the DSC focus lens(not shown) into an electric image signal by using a charge coupled device (not shown).

The second camera 24 has the DVC lens group 24a, a DVC driving unit 24b, a DVC detection unit 24c, and a DVC picture-taking unit 24d the operations of which are substantially the same as those of the first camera.

The DSC signal conversion unit 40 and the DVC signal conversion unit 45 remove noise included in the electric signals outputted from the DSC picture-taking unit 22d and the DVC picture-taking unit 24c, and amplify the gains in order for the levels of image signals converted into the electric signals to be outputted uniformly. Further, the DSC signal conversion unit 40 and the DVC signal conversion unit 45 respectively convert analog image signals that have been converted into electric signals into digital image signals, process the digital image signals, and output automatic control data.

The still image codec unit 50 compresses a still image signal outputted from the DSC signal conversion unit 40 by the controls of the control unit 90 using a compression process such as JPEG. The compressed still image data is stored in a storage medium such as a flash memory 62 of the storage unit 60.

The moving picture codec unit 65 compresses a moving-picture signal outputted from the DVC signal conversion unit 45 using a compression process such as MPEG by the controls of the control unit 90. The compressed moving-picture data is stored in a storage medium such as a tape 64.

If a reproduction command signal for a stored image signal is inputted from the input unit 70, the still image codec unit 50 and the moving picture codec unit 55 decompress the compressed coded data stored in the flash memory 62 and the tape 64.

For example, if a reproduction command signal for a still image is input from the input unit 70, the still image codec unit 50 decompresses the still image-coded data stored in the flash memory 62 and outputs the decompressed data to the display unit 80.

The input unit 70 has a picture-taking button 70a and plural operation buttons (not shown) for function performance to apply a picture-taking command signal for a subject to the control unit 90.

The display unit 80 has a view finder 82 or an LCD panel 84 provided on one side of the main body 10. The display unit 80 displays images captured through the DSC 22 or the DVC 24, or decompressed images according to the controls of the control unit 90.

The control unit 90 controls the overall operations of the picture-taking apparatus by using automatic control data outputted from various control programs stored in the storage unit 60 and the DSC signal conversion unit 40 or the DVC signal conversion unit 45.

The control unit 90 determines a picture-taking mode based on an output signal of the mode detection unit 30, and drives the camera part 20 according to the determined picture-taking mode. For example, if a signal indicating that the DSC 22 is turned on and the DVC 24 is turned off is inputted, the control unit 90 determines that the picture-taking mode of the camera unit 20 is in a still image mode.

Furthermore, if a picture-taking command signal is inputted from the picture-taking button 70a, the control unit 90 drives the DSC 22 based on the still image mode. If the control unit 90 is applied with a recording command signal from the input unit 70, the control unit 90 controls the still image codec unit 50 to compress an image signal for a picture-taken subject, and, if the control unit 90 inputs a reproduction command signal, the control unit 90 controls the still image codec unit 50 to decompress the compressed image signal, and displays the decompressed image signal on the display unit 80.

The combination of the DSC and the DVC as described above increases the number of function buttons for controlling the respective systems so that the combined product becomes complicated, causing difficulties in use.

SUMMARY OF THE INVENTION

The above described disadvantages are overcome and other advantages are realized in an embodiment of the present invention. An apparatus and method according to an embodiment of the present invention is adapted to control a display of a combined digital video camcorder (DVC) and digital still camera (DSC). The apparatus and method employ a first digital signal processor for outputting a component output signal to a first input of a component switch and a composite output signal to a first input of a composite switch. The apparatus and method further employ a second digital signal processor for outputting a component output signal to a second input of said component switch and a composite output signal to a second input of said composite. The apparatus and method further employ a picture-in-picture (PIP) signal mixing unit adapted to receive a selected output from said component switch and a selected output from said composite switch, and to generate a display output signal based on said selected output from the component switch and said selected output from the composite switch. The apparatus and method also use a control unit to control the component switch and the composite switch based on an input signal from an input unit.

BRIEF DESCRIPTION OF THE DRAWINGS

The above aspects and other features of the present invention will become more apparent with reference to the detailed description of an illustrative, non-limiting embodiment thereof contained herein along with reference to the attached drawings, in which.

DETAILED DESCRIPTION OF THE PREFERRED EMBODIMENT

Figure 2:
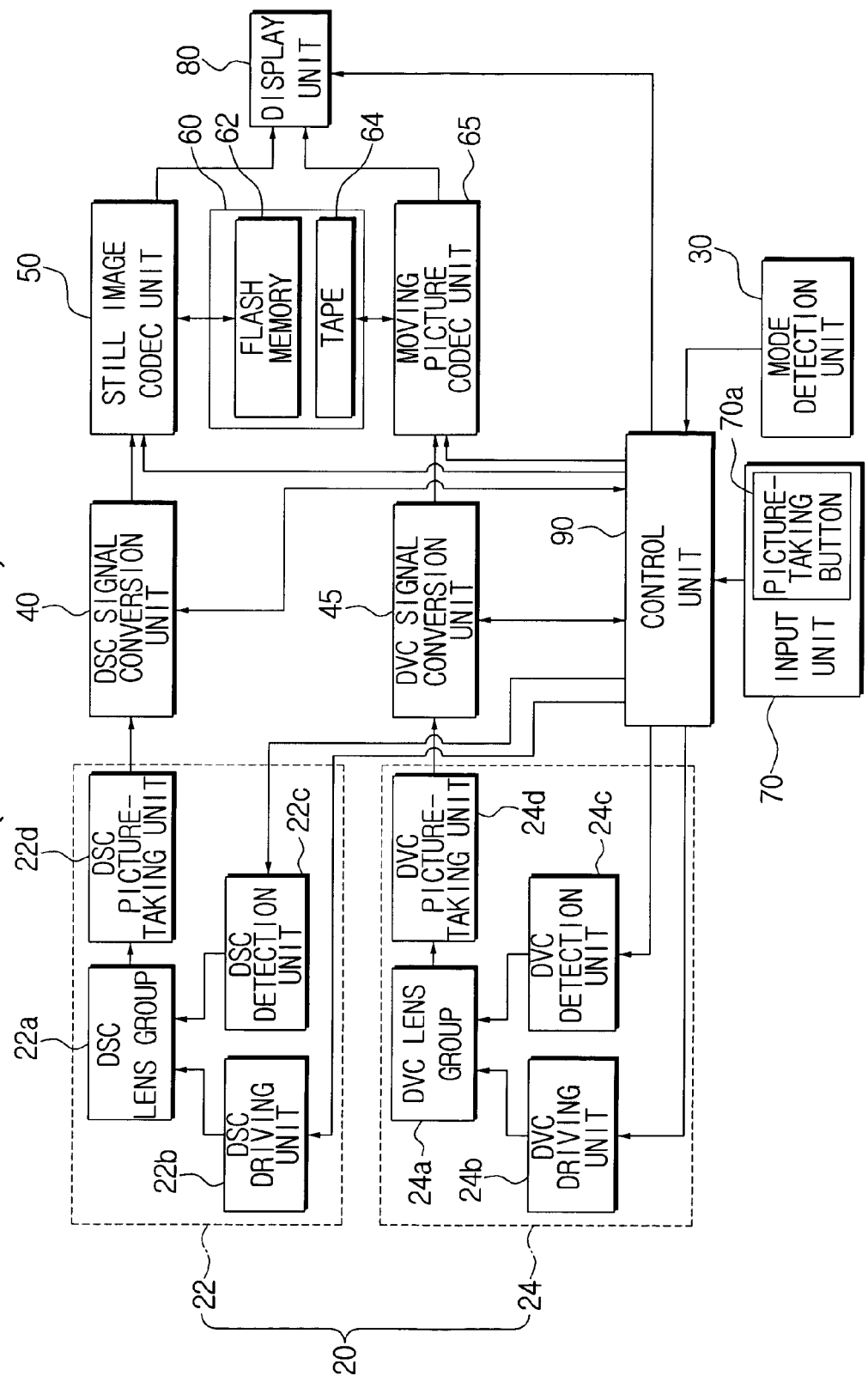
FIG. 2 is a block diagram for showing a digital signal process for the conventional picture-taking apparatus of FIG. 1.
Figure 3:
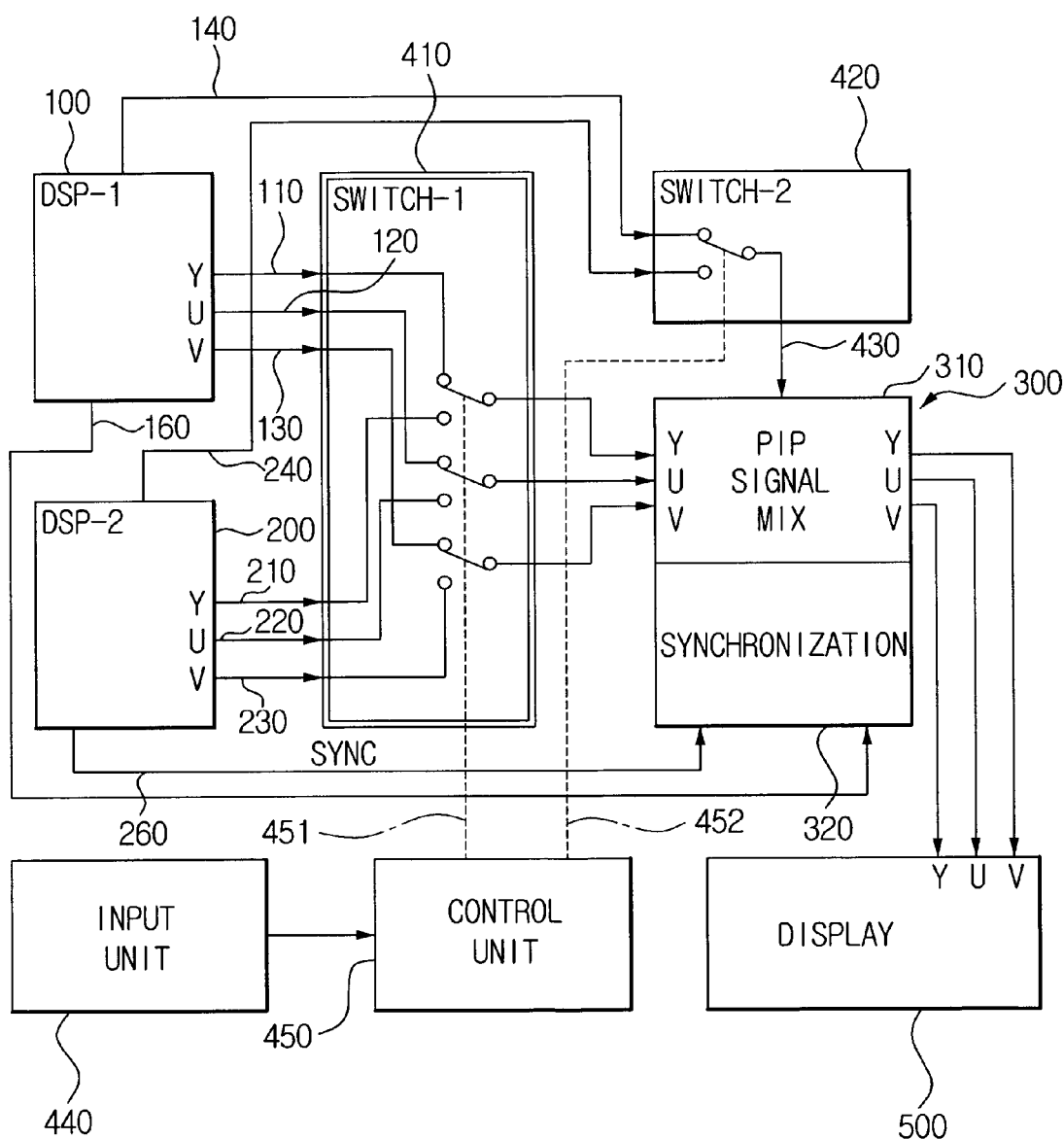
FIG. 3 is a block diagram illustrating a dual mode signal processing apparatus according to an embodiment of the present invention.

Hereinafter, an exemplary embodiment of the present invention will be described in detail with reference to the accompanying drawings. FIG. 3 is a block diagram illustrating a dual mode signal processing apparatus according to an embodiment of the present invention. The reference numerals and descriptions will be omitted for the same general digital processing components as those in the conventional technology of FIG. 2. As shown in FIG. 3, a dual mode signal processing apparatus using PIP windows according to an embodiment of the present invention has a signal processing unit (100, hereinafter, referred to as "DSP-1") for a digital still camera, a signal processing unit (200, hereinafter, referred to as "DSP-2") for a digital video camcorder, a first signal switching unit 410, a second signal switching unit 420, a PIP block 300, a display unit 500, an input unit with function buttons 440, and a control unit 450.

The DSP-1 100 and the DSP-2 200 process digital signals for the digital still camera and the digital video camcorder, respectively, and output the processed digital signals to the PIP block 300. The DSP-1 and the DSP-2 each have Y, U, and V terminals for inputting and outputting a main picture signal from and to the PIP block 300. The YUV format is one of color display formats for TVs in Europe. The DSP-1 and the DSP-2 have Y terminals 110 and 210 for a luminance signal, and U terminals 120 and 220 and V terminals 130 and 230 for chrominance signals, respectively, and output the signals to the first signal switching unit 410. The YUV format has been devised based on the fact that human eyes are more sensitive to luminance than colors, in which a color is divided into a Y component of luminance and U and V components of chrominance for its representation. A detailed description of the format is not presented here.

Further, the DSP-1 100 and the DSP-2 200 have composite image signal output terminals 140 and 240, respectively, for a sub-picture output signal in the PIP window, and the output terminals 140 and 240 are connected to the second signal switching unit 420. The DSP-1 100 and the DSP-2 200 have synchronous signal output terminals 160 and 260, respectively, that are connected to the PIP block 300, so that a synchronous signal is used for synchronization adjustments as a main picture and a sub-picture are displayed according to the controls of the controller 450.

The first signal switching unit 410 is a switch for selecting YUV signals for a main picture outputted from the DSP-1 100 and the DSP-2 200 and outputting the same to the PIP block 300.

The second signal switching unit 420 is a switch for selecting composite image signals 140 and 240 for a sub-picture outputted from the DSP-1 100 and the DSP-2 200 and outputting the same to the PIP block 300.

The PIP block 300 generally has a PIP signal processor 310 for processing signals to form a PIP window and a synchronization unit 320 for controlling synchronization for the main picture and the sub-picture in the PIP window. The PIP signal processor 310 inputs the YUV signals for the main picture from the first signal switching unit 410, and inputs a signal for the sub-picture from the second signal switching unit 420 via an sub-signal input terminal 430.

For a general display, an output of the first signal switching unit 420 is directly sent to the display unit 500, and, for a PIP window, the control unit 450 controls the synchronization of the synchronization unit 320 to output a mixed display of the main picture and the sub-picture.

The input unit 440 may have a button (not shown) for selecting a DSC mode and a DVC mode, a system control button for record and reproduction, and PIP window-related buttons.

The control unit 450 inputs a signal based on a selected button of the input unit 440, and outputs a control signal 451 for controlling the first signal switching unit 410 and a control signal 452 for switching the second signal switching unit 420. Additionally, the control unit 450 inputs signals based on selected PIP window-related buttons, and performs functions controlling the overall system.

Hereinafter, a description is made on operations of the dual mode signal processing apparatus using a PIP window that is structured as above according to an embodiment of the present invention.

Figure 1:
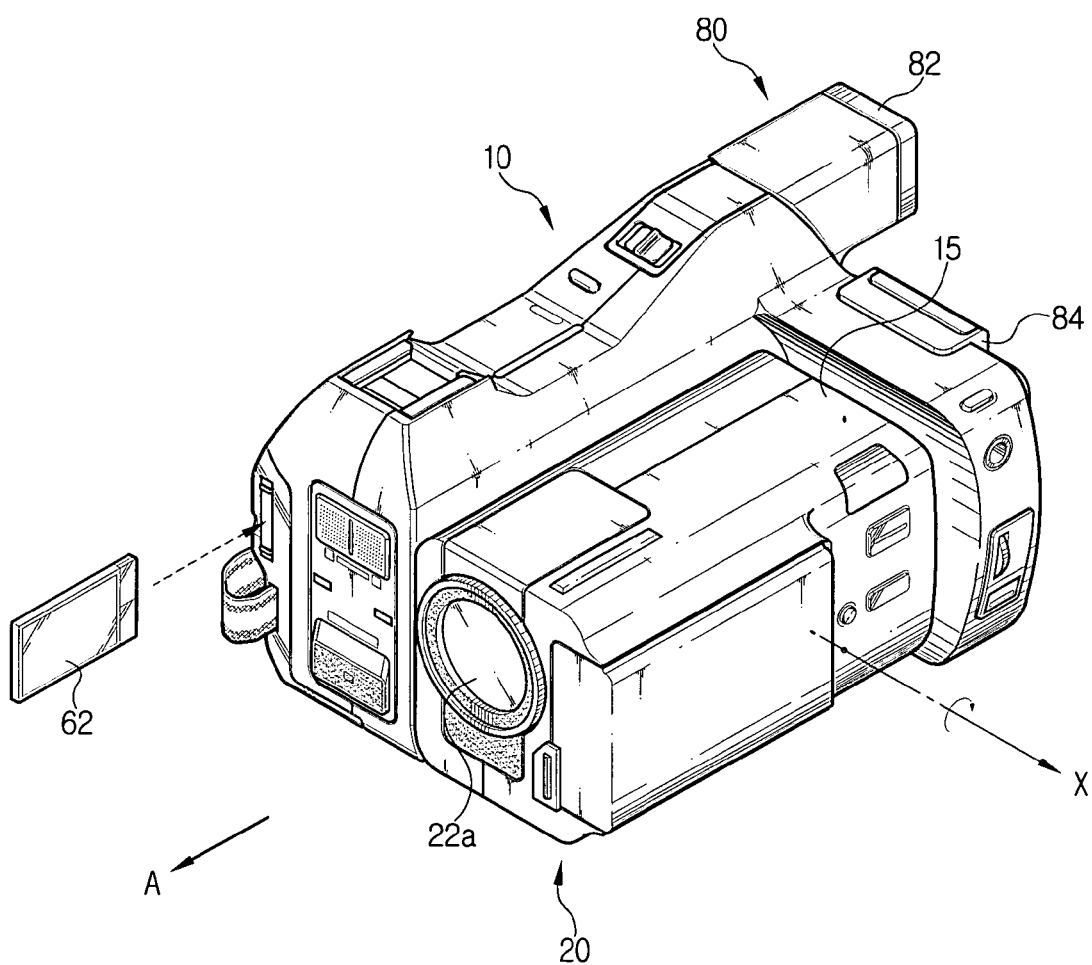
FIG. 1 is a perspective view for showing a conventional picture-taking apparatus combining a digital still camera and a digital video camcorder.

First, a description is made on a general mode rather than a PIP mode. If a user selects the DSC mode through the input unit 440, the control unit 450 outputs the switch control signal 451 so that the first signal switching unit 410 selects outputs of the YUV terminals of the DSP-1 100. Preferably, the mode selection can be made by a rotary contact switch operable without any button pressed. That is, the rotary contact switch (not shown) can detect a picture-taking mode for the digital still camera and the digital video camera according to a rotation angle of the camera part 20 with respect to the main body 10 of FIG. 1. It is more preferable to detect a picture-taking mode corresponding to the camera part 20 with respect to 180° as the camera part 20 rotates. The PIP block 300 is applied with the YUV signals 110, 120, and 130 of the DSP-1 100 inputted to the signal input terminals Y, U, and V, and outputs the YUV signals to be displayed on the display unit 500, so that a user can enjoy displays in the DSC mode.

Further, if the DVC mode is selected, the control unit 450 outputs the switch control signal 451 so that the first signal switching unit 420 selects the output terminals Y, U, and V of the DSP-2 200. The PIP block 300 is applied with the Y, U, and V signals 210, 220, and 230 of the DSP-2 200 inputted to the signal input terminals Y, U, and V, and outputs the Y, U, and V signals to be displayed on the display unit 500, so that a user can enjoy displays in the DVC mode.

Figure 4A:
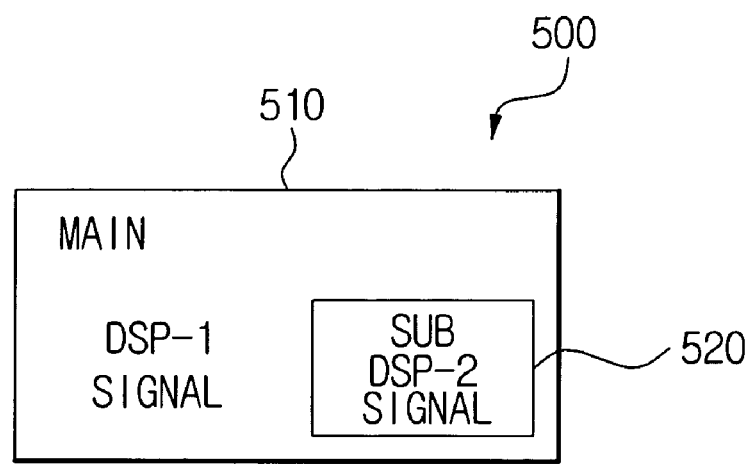
FIG. 4 illustrates a main picture/sub-picture switchover according to an embodiment of the present invention.
Figure 4B:
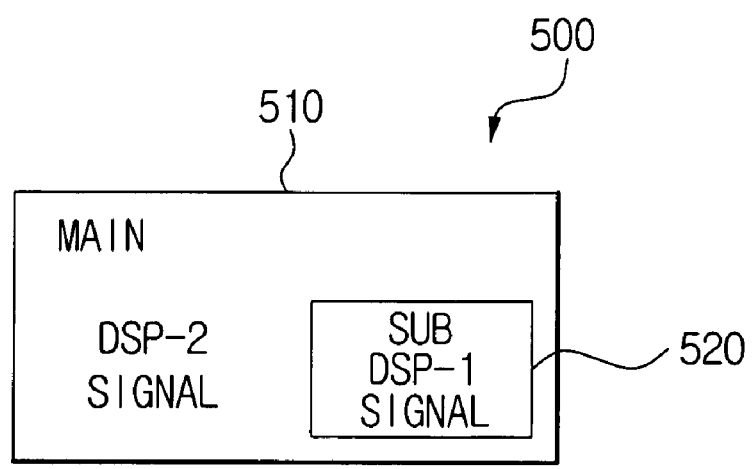

In the meantime, if a user presses a PIP window switching button (not shown) on the input unit 440 while the camera is in the DSC mode, the control unit 450 controls the second signal switching unit 420 so that the composite image signal 240 of the DSP-2 200 is sent to the auxiliary signal input terminal 430 of the PIP block 300. Accordingly, the PIP block 300 processes the Y, U, and V signals of the DSP-1 100 inputted through the first signal switching unit 410 for the main picture of the mixed display, and processes the composite image signal 240 of the DSP-2 200 inputted through the auxiliary signal input terminal 430 of the second signal switching unit 420 for the PIP window of the mixed display (refer to FIG. 4A). At this time, the main view and the PIP window are synchronized for outputs with reference to a synchronization signal inputted through the synchronization unit 320. For reference, FIG. 4 is a view illustrating displays with a PIP window on the display unit 500. FIG. 4a shows that the main view is based on the DSP-1 signal, that is, the DSC mode, while the sub-window is based on the sub-DSP-1 signal, that is, the DVC mode. FIG. 4b shows that the main view is based on the DSP-2 signal, that is, the DVC mode, while the sub-window is based on the sub-DSP-2 signal, that is, the DSC mode.

In such a display, if a user operates a main/sub-picture switchover button (not shown) as shown in FIG. 4B, the control unit 450 controls the first signal switching unit to be switched to select the Y, U, and V signals of the DSP-2 200, and controls the second signal switching unit to be switched to output the composite image signal 140 of the DSP-1 100 to the output terminal 430, so that the PIP block 300 outputs the Y, U, and V signals 210, 220, and 230 of the DSP-2 200 for the main view and outputs the composite image signal 140 of the DSP-1 100 for the PIP window.

Embodiments of the present invention are advantageous for users, in part because the users can avoid confusion if various function buttons such as zoom function are activated in the main picture of the mixed display.

Furthermore, if a user selects a PIP window switching button (not shown) through the input unit 440 during watching displays in the DVC mode, the same operations are repeated so that the second signal switching unit 420 processes the composite image signal 140 of the DSP-1 100 for the sub-picture to output the mixed display. Also, if the user selects a main/sub-picture switchover button (not shown), the control unit 450 controls the first signal switching unit to be switched to select the Y, U, and V signals of the DSP-1 100, and also the second signal switching unit to be switched to output the composite image signal 240 of the DSP-2 200 to the input terminal 430, so that the PIP block 300 outputs the Y, U, and V signals 110, 120, and 130 of the DSP-1 100 for the main view, and outputs the composite image signal 240 of the DSP-2 200 for the PIP window.

As above, the dual mode signal processing apparatus using a PIP window according to an embodiment of the present invention converts the function of the system by changes of the main picture and the sub-picture in the mixed display from two mixed image signals, and enables the same functions to operate with one button selection, to thereby perform combined functions with simplicity.

Although the preferred embodiment of the present invention has been described, it will be understood by those skilled in the art that the present invention should not be limited to the described preferred embodiment, but various changes and modifications can be made within the spirit and scope of the present invention as defined by the appended claims.

What is claimed is:

1. An apparatus for controlling a display of a combined digital video camcorder (DVC) and digital still camera (DSC) comprising:
    a first digital signal processor adapted to output a component output signal to a first input of a component switch and a composite output signal to a first input of a composite switch;
    a second digital signal processor adapted to output a component output signal to a second input of said component switch and a composite output signal to a second input of said composite switch;
    a picture-in-picture (PIP) signal mixing unit adapted to receive a selected output from said component switch and a selected output from said composite switch, and to generate a display output signal based on said selected output from said component switch and said selected output from said composite switch; and
    a control unit adapted to control said component switch and said composite switch based on an input signal from an input unit.

2. The apparatus of claim 1, wherein said control unit is further adapted to control said PIP signal mixing unit to enter a PIP-mode, and to thereby generate a PIP output comprising a main image based on said selected output from said component switch and a sub-window image based on said selected output from said composite switch.

3. The apparatus of claim 1, wherein said control unit is further adapted to control said PIP signal mixing unit to enter a general mode, and to thereby generate a PIP output comprising a main image based on said selected output from said component switch.

4. The apparatus of claim 1, wherein said control unit is further adapted to control said component switch and said composite switch in a first mode, in which said component output signal of said first digital signal processor is selected by said component switch and said composite output of said second digital signal processor is selected by said composite switch, or in a second mode, in which said component output of said second digital signal processor is selected by said component switch and said composite output of said first digital signal processor is selected by said composite switch.

5. The apparatus of claim 1, wherein each said component output signals comprises at least one luminance signal and at least two chrominance signals.

6. The apparatus of claim 1, wherein said input unit comprises a PIP-mode selection switch.

7. The apparatus of claim 1, wherein said input unit comprises a PIP swap switch.

8. A method of controlling a display of a combined digital video camcorder (DVC) and digital still camera (DSC) comprising the steps of:
   selecting a component output of a first digital signal processor and a composite output of a second digital signal processor when said camera is in a first mode;
   selecting a component output of said second digital signal processor and a composite output of said first digital signal processor when said camera is in a second mode; and
   generating a picture-in-picture (PIP) output display comprising the selected component output signal combined with a sub-window generated from the selected composite output signal.

9. The method of claim 8, further comprising the steps of:
   receiving a swap command from an input unit; and
   switching between said first mode and said second mode in response to said swap command.

10. The method of claim 8, further comprising the steps of:
    receiving a PIP-mode selection command; and
    generating said picture-in-picture (PIP) output display comprising only the selected component output signal in response to said PIP-mode selection command.

11. The method of claim 8, wherein each of said component output signals comprises at least one luminance signal and at least two chrominance signals.

* * * * *